US010294898B2

(12) United States Patent
Naruoka et al.

(10) Patent No.: US 10,294,898 B2
(45) Date of Patent: May 21, 2019

(54) AIR INTAKE CHAMBER STRUCTURE

(71) Applicant: Kawasaki Jukogyo Kabushiki Kaisha, Kobe shi, Hyogo (JP)

(72) Inventors: Shohei Naruoka, Kakogawa (JP); Koji Nomura, Akashi (JP)

(73) Assignee: KAWASAKI JUKOGYO KABUSHIKI KAISHA (JP)

( * ) Notice: Subject to any disclaimer, the term of this patent is extended or adjusted under 35 U.S.C. 154(b) by 133 days.

(21) Appl. No.: 15/701,941

(22) Filed: Sep. 12, 2017

(65) Prior Publication Data

US 2018/0119654 A1 May 3, 2018

(30) Foreign Application Priority Data

Nov. 2, 2016 (JP) ................................ 2016-215298

(51) Int. Cl.

| | |
|---|---|
| ***F02M 35/10*** | (2006.01) |
| ***B62J 17/00*** | (2006.01) |
| *F02M 35/16* | (2006.01) |
| *F02B 33/44* | (2006.01) |
| *B62K 19/48* | (2006.01) |

(52) U.S. Cl.

CPC ........ *F02M 35/10157* (2013.01); *B62J 17/00* (2013.01); *B62K 19/48* (2013.01); *F02B 33/44* (2013.01); *F02M 35/162* (2013.01); *Y02T 10/144* (2013.01)

(58) Field of Classification Search

CPC . F02M 35/10157; F02M 35/162; B62J 17/00; B62K 19/48; F02B 33/44

See application file for complete search history.

(56) References Cited

U.S. PATENT DOCUMENTS

| | | | | |
|---|---|---|---|---|
| 4,890,586 A * | 1/1990 | Fujii | F02B 27/0231 | 123/184.55 |
| 6,422,201 B1 * | 7/2002 | Yamada | F02B 27/06 | 123/184.53 |
| 6,422,332 B1 * | 7/2002 | Takata | F02B 61/02 | 123/41.01 |
| 7,357,205 B2 * | 4/2008 | Nishizawa | F02M 35/022 | 123/41.56 |
| 7,543,450 B2 * | 6/2009 | Miura | F02B 29/0462 | 60/597 |
| 7,640,921 B2 * | 1/2010 | Konakawa | F02M 35/10039 | 123/590 |

(Continued)

FOREIGN PATENT DOCUMENTS

WO WO2014/185089 11/2014

*Primary Examiner* — Kevin Hurley
*Assistant Examiner* — Gabriela C Craciun

(57) ABSTRACT

The motorcycle includes: a supercharger that pressurizes intake air to supply the pressurized intake air to an engine; and an intake air tank forming an air intake chamber therein, which air intake chamber is provided at the downstream side of the supercharger with respect to an intake air flow direction and stores the intake air. The air intake chamber structure further includes an intake pipe formed as a separate body from the intake air tank and mounted on the intake air tank. The intake pipe serves as an inlet of the air intake chamber and projects inward of the air intake chamber. A projecting end portion of the intake pipe has a passage area that increases toward the downstream side in the intake air flow direction.

8 Claims, 5 Drawing Sheets

(56) References Cited

U.S. PATENT DOCUMENTS

| | | | | |
|---|---|---|---|---|
| 7,806,212 | B2 * | 10/2010 | Sudoh | F02B 27/0231 123/184.55 |
| 8,707,931 | B2 * | 4/2014 | Arima | F02B 33/32 123/478 |
| 8,839,756 | B2 * | 9/2014 | Ozaki | F02M 35/10091 123/184.53 |
| 9,010,295 | B2 * | 4/2015 | Yamagishi | F02M 35/024 123/184.56 |
| 9,518,504 | B2 * | 12/2016 | Tanaka | B62K 11/04 |
| 9,592,873 | B2 * | 3/2017 | Tsubone | B62J 37/00 |
| 10,113,518 | B2 * | 10/2018 | Arai | B62M 7/02 |
| 10,138,823 | B2 * | 11/2018 | Ichi | F02D 23/00 |
| 2005/0183690 | A1 * | 8/2005 | Nishizawa | F02M 35/024 123/198 E |
| 2007/0023214 | A1 * | 2/2007 | Ishida | B62J 17/06 180/68.3 |
| 2007/0267235 | A1 * | 11/2007 | Sudoh | F02B 27/0231 180/68.3 |
| 2012/0180746 | A1 * | 7/2012 | Yamagishi | F02M 35/024 123/184.56 |
| 2013/0220259 | A1 * | 8/2013 | Ozaki | F02M 35/10091 123/184.21 |
| 2015/0107563 | A1 * | 4/2015 | Naruoka | F02M 35/14 123/559.1 |
| 2015/0275830 | A1 * | 10/2015 | Watanabe | F02B 39/04 123/559.1 |
| 2016/0009329 | A1 * | 1/2016 | Tsubone | B62J 37/00 180/229 |
| 2016/0061162 | A1 | 3/2016 | Watanabe et al. | |
| 2017/0089307 | A1 * | 3/2017 | Arai | B62M 7/02 |

* cited by examiner

AIR INTAKE CHAMBER STRUCTURE

CROSS REFERENCE TO THE RELATED APPLICATION

This application is based on and claims Convention priority to Japanese patent application No. 2016-215298, filed Nov. 2, 2016, the entire disclosure of which is herein incorporated by reference as a part of this application.

BACKGROUND OF THE INVENTION

Field of the Invention

The present invention relates to an air intake chamber structure in which an air intake chamber storing intake air is provided in an air intake passage having a supercharger that pressurizes intake air and that supplies the pressurized intake air to an engine.

Description of Related Art

An engine has been known in which: a supercharger is provided for pressurizing intake air and supplying the pressurized intake air to an engine; and an air intake chamber is provided for storing the intake air at the downstream side of the supercharger (for example, WO2014/185089). In WO2014/185089, an intake pipe projecting outward from an intake air tank is mounted on the intake air tank having the air intake chamber defined therein, and a discharge port of the supercharger is connected to the intake pipe. Furthermore, by devising the shape of the intake air tank, especially the shape of the upstream side portion of the intake air tank, the tank capacity is secured and the output of the engine is improved.

However, in WO2014/185089, the arrangement of a projecting inlet of the intake air tank is restricted by the shape of intake air tank, whereby a degree of freedom of arrangement for each of the inlet and the supercharger is restricted. Especially, in a saddle-riding vehicle such as a motorcycle, since the installation space is limited, a further improvement of the engine output is not easy.

SUMMARY OF THE INVENTION

An object of the present invention is to provide an air intake chamber structure in which the output of the engine can be improved while a degree of freedom of arrangement of the inlet of an intake air tank can be improved.

In order to achieve the above-described object, an air intake chamber structure in the present invention includes an air intake passage having a supercharger that pressurizes intake air to supply the pressurized intake air to an engine; an intake air tank forming an air intake chamber therein, the air intake chamber storing the pressurized intake air; and an intake pipe mounted on the intake air tank and formed as a separate body from the intake air tank, in which case the intake pipe serves as an inlet of the air intake chamber and projects inward of the air intake chamber, and at least a projecting end portion in the intake pipe has a passage area that increases toward a downstream side with respect to an intake air flow direction.

According to this configuration, since the intake pipe does not project outward from the intake air tank, it is possible to reduce the size of an intake air tank while a decrease in the tank volume is suppressed and the engine output is maintained. As a result, it is possible to achieve space saving for the air intake chamber structure. In addition, since at least the projecting end portion with respect to the intake pipe has a passage area that increases toward the downstream side in the intake air flow direction, intake air gradually decelerates within the intake pipe and is then introduced into the intake air tank. That is, it is possible to suppress rapid expansion of an air intake passage within the intake air tank. Therefore, the flow of intake air is rendered to be smooth, thus decreasing passage loss or pipe friction loss and increasing an amount of intake air to be supplied to the engine. Accordingly, it is possible to improve the engine output without increasing the volume of an air intake chamber.

Since the intake air tank and the intake pipe are provided as separate bodies, it is possible to form the intake pipe without being restricted by the shape of intake air tank and to improve a degree of freedom of arrangement of the inlet of the intake pipe.

In the present invention, a passage area in the intake pipe may be set to be larger at an outlet thereof than at an inlet thereof, and may gradually increase from the inlet toward the outlet so as to have a flare shape. According to this configuration, since the passage area gradually increases toward the downstream, intake air can be smoothly filled in the air intake chamber while passage loss of intake air within the intake pipe is suppressed.

In the present invention, the intake air tank may include first and second tank half bodies and the first and second tank half bodies may be formed by die-casting molding, in which case the intake pipe may be fastened to one of the first and second tank half bodies by means of a fastening member accessible from a side of the other of the first and second tank half bodies. According to this configuration, the fastening direction of the fastening member is set in consideration of a demoting direction of die-casting molding. As a result, it is possible to set the intake pipe having fastening workability and mass productivity, both of which are better than those when the intake pike is manufactured by cutting out from gravity casting or ingot.

When the intake pipe is fastened to the intake air tank by means of a fastening member, the fastening member may be located at an upstream side relative to a protruding end of the intake pipe with respect to the intake air flow direction. According to this configuration, since the fastening member is located at the upstream side relative to the protruding end of the intake pipe, air discharged from the intake pipe is less subject to flow resistance due to the fastening member.

When the intake pipe is fastened to the intake air tank by means of a fastening member, a fastening direction of the fastening member may be in parallel with a plane perpendicular to the intake air flow direction within the intake pipe. According to this configuration, when the fastening member is mounted, it is possible to mount the intake pipe on the intake air tank without restricting the shape of the intake pipe having a passage area that increases toward the downstream. Therefore, it is possible to prevent a decrease in suction efficiency due to the fastening member.

When the intake air tank includes first and second tank half bodies and the first and second tank half bodies are formed by die-casting molding, a rib may be formed on an outer surface of the one tank half body on which the intake pipe is mounted, which rib facilitates fluidity of molten metal within the one tank half body at a time of die-casting molding. According to this configuration, since the surface area of the intake air tank increases, heat radiation is improved.

In the present invention, a screen member that removes foreign matter may be mounted within a passage of the intake pipe. According to this configuration, it is possible to prevent foreign matter from intruding into the engine.

A saddle-riding vehicle in the present invention includes the air intake chamber structure in the present invention, wherein: the engine includes a crankcase supporting a crankshaft, a cylinder projecting upward from a front portion of the crankcase, and a cylinder head disposed above the cylinder and forming an upper surface of a combustion chamber therein; the supercharger is disposed above the crankcase in a side view; the intake air tank is disposed above the supercharger; and an outlet of the supercharger is directed upward toward the intake air tank, and the outlet of the supercharger and the intake pipe are connected to each other through a connecting pipe.

According to this configuration, it is possible to set as appropriate the angle of the connecting pipe once a slid able pulled-out core has been set as a mold structure at a time of die-casting molding. Therefore, a degree of freedom of arrangement of the supercharger to be connected to the connecting pipe is improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, preferred embodiments of the present invention will be described with reference to the accompanying drawings. In this specification, the terms “left side” and “right side” are the left side and the right side, respectively, as viewed from a driver riding a vehicle. In addition, the terms “upstream side” and “downstream side” are the upstream side and the downstream side, respectively, with respect to an intake air flow direction.

Figure 1:
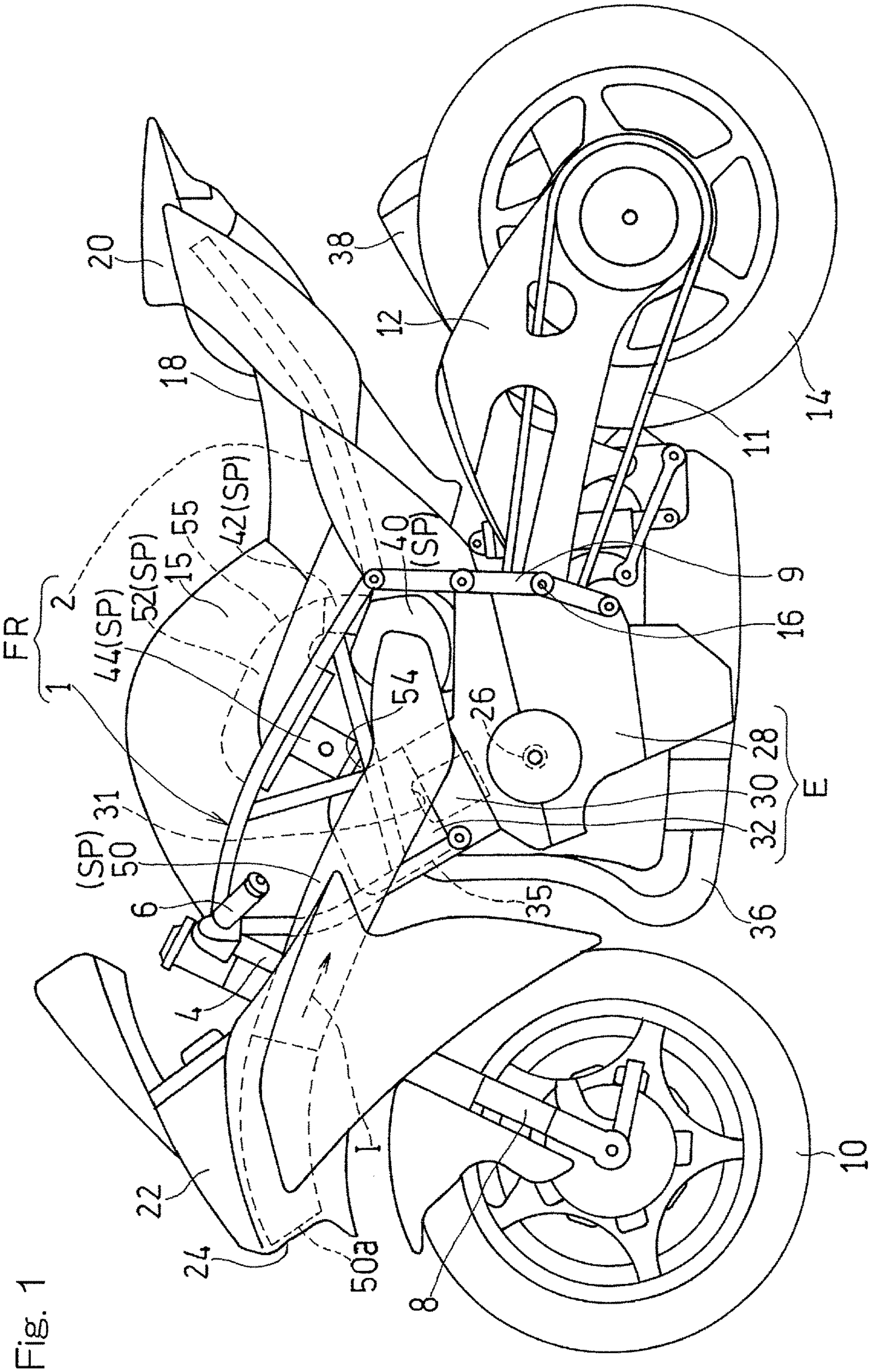
FIG. 1 is a side view showing a motorcycle including an air intake chamber structure according to a first embodiment of the present invention.

FIG. 1 is a side view showing a motorcycle including an air intake chamber structure according to a first embodiment of the present invention. A motorcycle frame structure FR for the motorcycle includes a main frame 1 that forms a front half of the motorcycle frame structure FR, and a rear frame 2 that forms a rear half of the motorcycle frame structure FR. A head pipe 4 is provided at a front end of the main frame 1, and a front fork 8 is rotatably supported by the head pipe 4 through a steering shaft (not shown). A steering handle 6 is fixed to an upper end portion of the front fork 8, and a front wheel 10 is fitted to a lower end portion of the front fork 8.

A swingarm bracket 9 is provided at a rear end portion of the main frame 1. A swingarm 12 is supported for swing movement in an up-down direction or vertical direction about a pivot shaft 16 which is mounted to the swingarm bracket 9. A rear wheel 14 is rotatably supported by a rear end portion of the swingarm 12.

An engine E is fitted to a lower portion of the main frame 1 and at the front side of the swingarm bracket 9. A rotational force of the engine E is transmitted to the rear wheel 14 through a power transmission member 11 such as a drive chain, so as to drive the rear wheel 14. The power transmission member 11 is not limited to a drive chain made from metal, and may be, for example, a drive belt made from rubber or resin, a drive shaft that transmits power of the engine through a bevel gear, or the like. In the present embodiment, the engine E is a four-cylinder four-cycle type multi-cylinder engine. However, the type of the engine E is not limited thereto.

The engine E includes: a crankshaft 26 extending in a vehicle widthwise direction and being an engine rotary shaft; a crankcase 28 supporting the crankshaft 26; a cylinder 30 projecting upward from an upper surface of a front portion of the crankcase 28; and a cylinder head 32 provided above the cylinder 30. An upper surface of a combustion chamber 31 is formed in the cylinder head 32, and a lower surface of the combustion chamber 31 is formed in the cylinder 30. The cylinder 30 and the cylinder head 32 are inclined frontward. That is, the engine E has a substantially L-shaped form that is inclined forward in a side view. However, the cylinder 30 and the cylinder head 32 in the engine E may extend forward or backward from the crankcase 28. The crankshaft in the engine E may extend in a front-rear direction or longitudinal direction of the motorcycle, and the cylinder 30 and the cylinder head 32 may extend in the vehicle widthwise direction or diagonally upward towards the vehicle widthwise direction.

The cylinder 30, the cylinder head 32 and a piston (not shown) cooperate together to constitute the combustion chamber 31. Intake of air and fuel into the combustion chamber 31 through an air intake port 54 is performed, and exhaust is performed through an exhaust port 35. Four exhaust pipes 36 are connected to the four exhaust ports 35 in a front surface of the cylinder head 32. The four exhaust pipes 36 are merged together at a location beneath the engine E, and are connected to an exhaust muffler 38 which is disposed at the right side of the rear wheel 14.

A fuel tank 15 is disposed on an upper portion of the main frame 1, and a rider’s seat 18 and a passenger’s seat 20 are supported by the rear frame 2. In addition, a cowling or fairing 22 made of a resinous material is mounted on a front portion of the motorcycle. The cowling 22 covers a portion from front of the head pipe 4 to outer lateral sides of the front portion of the motorcycle. An air inlet 24 is formed in the cowling 22. The air inlet 24 is located at a front end of the cowling 22, and takes in intake air from the outside to the engine E.

An air intake duct 50 is disposed at the left side of the motorcycle frame structure FR. The air intake duct 50 is supported by the head pipe 4 such that a front end opening 50*a* thereof is opposed to the air inlet 24 of the cowling 22. That is, the front end opening 50*a* of the air intake duct 50 communicates with the air inlet 24. The air inlet 24 opens forward and takes in a coming wind as intake air I. Accordingly, the pressure of air introduced through the front end opening 50*a* of the air intake duct 50 is increased by a ram effect. However, the air intake duct 50 may be disposed at the right side of the motorcycle.

Figure 2:
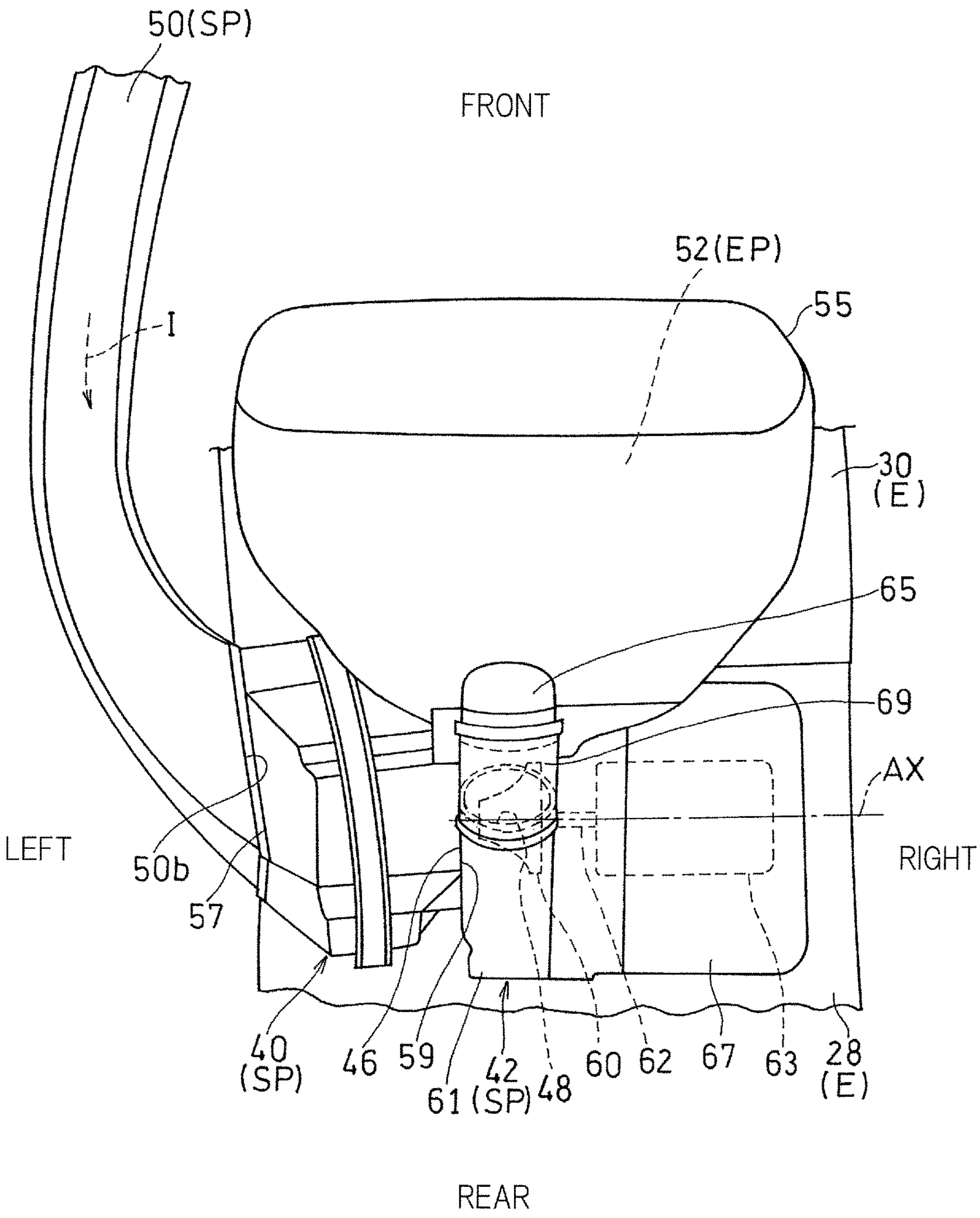
FIG. 2 is a perspective view of the motorcycle as viewed from the rear and above thereof.

An air cleaner 40 and a supercharger 42 are disposed rearward of the cylinder 30 and on an upper surface of a rear portion of the crankcase 28. The air cleaner 40 and the supercharger 42 are arranged in the vehicle widthwise direction such that the air cleaner 40 is located at the outer side. The air intake duct 50 extends from front of the engine E through left outer lateral sides of the cylinder 30 and the cylinder head 32, and introduces the intake air I to the supercharger 42 through the air cleaner 40. The air intake duct 50 curves inwardly in the vehicle widthwise direction rearward of the cylinder 30, and as shown in FIG. 2, is connected to a cleaner inlet 57 of the air cleaner 40 at a rear end portion 50*b* of the air intake duct 50. The air cleaner 40 filters and purifies air (the intake air I) introduced from the air intake duct 50. The supercharger 42 pressurizes the air cleaned by the air cleaner 40, and supplies it to the engine E.

An intake air tank 55 is disposed between the supercharger 42 and the air intake port 54 at a rear portion of the cylinder head 32, as shown in FIG. 1. A discharge port 48 of the supercharger 42 is connected to the intake air tank 55. The intake air tank 55 has therein an air intake chamber 52 that stores the high-pressure intake air I supplied from the supercharger 42. A throttle body 44 is provided between the intake air tank 55 and the air intake port 54. The throttle body 44 includes an injector (not shown) that supplies fuel and a throttle valve that adjusts the amount of intake air.

The air intake duct 50, the air cleaner 40, the supercharger 42, the intake air tank 55 and the throttle body 44 cooperate together to constitute an air intake passage SP that supplies intake air to the air intake port 54 of the engine E. The air intake chamber 52 is provided at the downstream side of the supercharger 42 in the air intake passage SP.

The air intake chamber 52 is disposed above the supercharger 42 and the throttle body 44, and above and rearward of the cylinder head 32. The air cleaner 40 is disposed between the crankcase 28 and the air intake chamber 52 above the crankcase 28 in a side view. The fuel tank 15 is disposed above the air intake chamber 52 and the throttle body 44.

As shown in FIG. 2 that is a plan view, the supercharger 42 is disposed at the right side of the air cleaner 40, and is fixed to the upper surface of the crankcase 28 by means of bolts (not shown). However, when the air intake duct 50 is disposed at the right side of the motorcycle, the supercharger 42 is disposed at the left side of the air cleaner 40. The supercharger 42 in the present embodiment is a mechanical supercharger driven by the crankshaft 26 (FIG. 1) of the engine E. The supercharger 42 has a rotation axis AX extending in the same direction as that of the crankshaft 26, i.e., in the vehicle widthwise direction (right-left direction) in the present embodiment. A suction port 46 of the supercharger 42 open leftward and the discharge port 48 of the supercharger 42 open upward are located above the crankcase 28 and at a center portion of the engine E in the vehicle widthwise direction. However, when the air intake duct 50 is disposed at the right side of the motorcycle, the suction port 46 is open rightward.

The supercharger 42 includes: a centrifugal type impeller 60 that pressurizes intake air; a supercharger rotary shaft 62 to which the impeller 60 is fixed; an impeller housing 61 that covers the impeller 60, a transmission mechanism 63 that transmits power of the engine E to the impeller 60; and a transmission mechanism housing 67 that covers the transmission mechanism 63. The air cleaner 40 is disposed at one of the sides (left side) of the impeller housing 61 in the vehicle widthwise direction, and the transmission mechanism 63 is disposed at the other side (right side) of the impeller housing 61 in the vehicle widthwise direction. The transmission mechanism 63 may include a speed change mechanism. The suction port 46 and the discharge port 48 are formed in the impeller housing 61. The impeller housing 61 and the transmission mechanism housing 67 are connected to each other by means of bolts (not shown).

The suction port 46 of the supercharger 42 is connected to a cleaner outlet 59 of the air cleaner 40. The cleaner outlet 59 and the suction port 46 are connected to each other by means of a fastening member (not shown) such as a bolt. However, the connection structure is not limited thereto.

Figure 3:
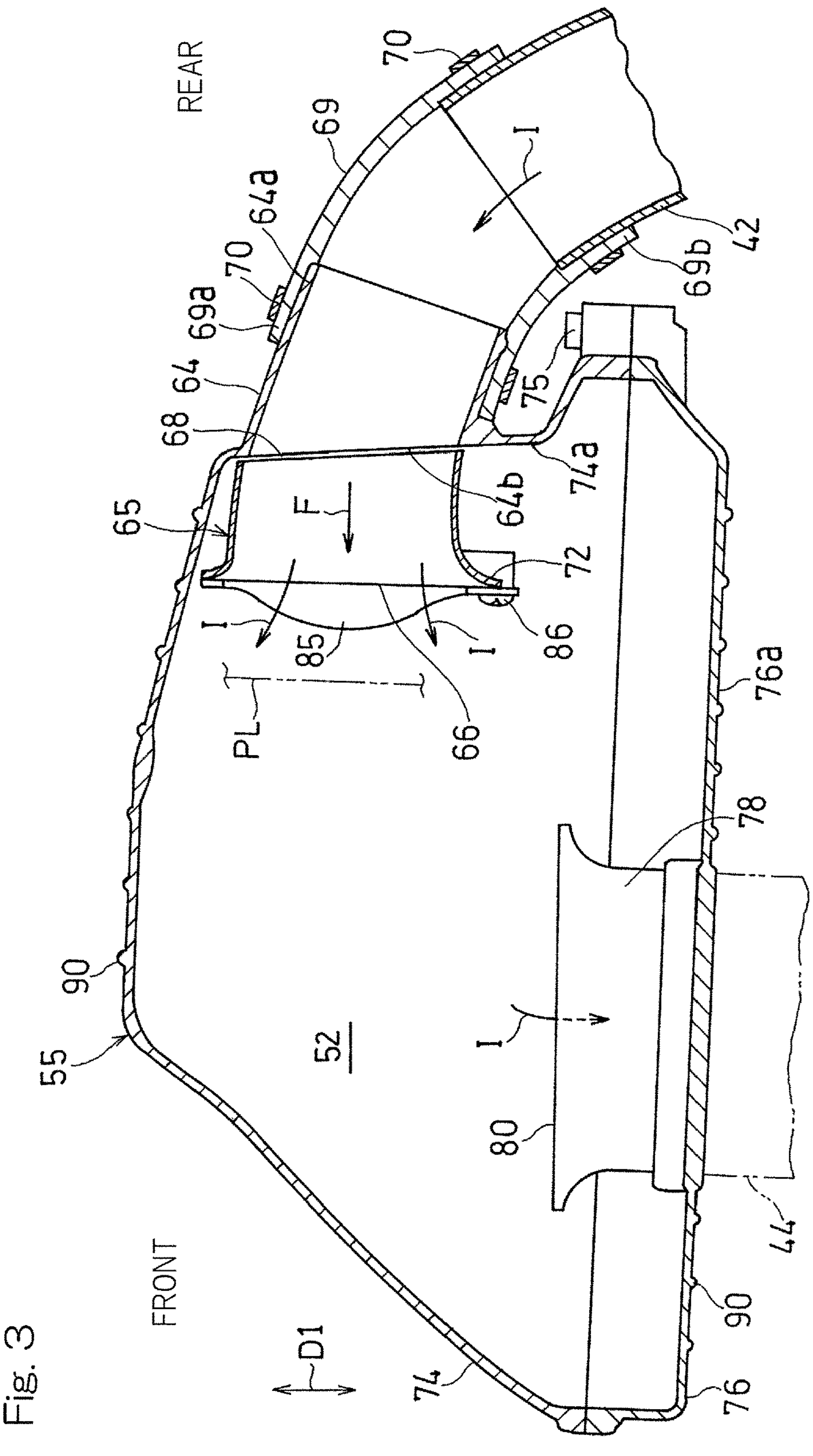
FIG. 3 is a longitudinal cross-sectional view showing the air intake chamber structure.

The discharge port 48 of the supercharger 42, directed upward toward the air intake chamber 52, is connected to an inlet 66 of the air intake chamber 52 through a connecting pipe 64. Specifically, as shown in FIG. 3, a tubular intake pipe 65 mounted on the intake air tank 55 is provided as a separate body from the intake air tank 55. The connecting pipe 64 integrally formed with the intake air tank 55 communicates with the intake pipe 65. The connecting pipe 64 and the discharge port 48 of the supercharger 42 are connected to each other by means of a connecting pipe 69. The connecting pipe 69 is, for example, implemented as a cylindrical pipe made of elastic resin. In the present embodiment, the connecting pipe 69 is implemented as a rubber tube.

The connecting pipe 64 has a shape of a cylindrical pipe and projects outward from the intake air tank 55. In the present embodiment, the connecting pipe 64 extends so as to tilt downward in the rear direction of the intake air tank 55. One end portion 69*a* of the connecting pipe 69 is fitted to an outer circumference of the upstream end portion (rear end portion) 64*a* of the connecting pipe 64, and is prevented from slipping off by means of a fixing member 70 such as a clamp. The other end portion 69*b* of the connecting pipe 69 is fitted to the discharge port 48 of the supercharger 42, and is prevented from slipping off by means of the fixing member 70 such as a clamp. The connecting pipe 64 has an opening 64*b* at the downstream end thereof, which communicates with a pipe inlet 68 of the intake pipe 65. The opening (outlet) 64*b* at the downstream end of the connecting pipe 64 is formed at a center portion, in the vehicle widthwise direction, of the intake air tank 55, and the opening 64*b* and the pipe inlet 68 of the intake pipe 65 are coaxially arranged.

The opening (outlet) 64*b* at the downstream end of the connecting pipe 64 is offset to one side with respect to tank wall surfaces that are adjacent to both sides (upper and lower sides) interposing the axis. In the present embodiment, the outlet 64*b* of the connecting pipe 64 is disposed so as to be displaced upward with respect to a middle position in the vertical direction of the intake air tank 55. That is, a distance between the intake pipe 65 and an upper surface of the intake air tank 55 is smaller than a distance between the intake pipe 65 and a lower surface of the intake air tank 55.

The intake pipe 65 projects inward of the air intake chamber 52 from a wall surface of the intake air tank 55, and constitutes the inlet 66 of the air intake chamber 52. It is noted that "the inlet 66 of the air intake chamber 52" refers to an opening opposed to the air intake chamber 52 within the intake air tank 55, and refers to the pipe outlet 66 of the intake pipe 65 in the present embodiment. In the present embodiment, the intake pipe 65 is a resin molded product. However, the material of the intake pipe 65 is not limited thereto, and may be a metal such as aluminum or iron.

The intake pipe 65 has a passage area set to be larger at the pipe outlet 66 than at the pipe inlet 68. The intake pipe 65 has a passage area that increases toward the downstream side with respect to the intake air flow direction F, so as to have a flare shape. Accordingly, the passage area gradually increases toward the downstream. Therefore, intake air gradually decelerates within the intake pipe 65, and then is introduced into the intake air tank 55. As a result, suction efficiency is improved.

In the present embodiment, the intake pipe 65 has a trumpet-like shape or an inverse bell mouth shape in which a passage area is constant from the upstream end, at which the pipe inlet 68 is formed, to a projecting end portion (downstream end portion) 72 and rapidly increases at the projecting end portion 72 toward the downstream side in the intake air flow direction F. A cross-sectional shape of the intake pipe 65 in the present embodiment is substantially perfect circular, but may be elliptical. In the projecting end portion (downstream end portion) 72 of the intake pipe 65 in the present embodiment, the radial dimension with respect to the axis is formed larger on the lower side than on the upper side. Accordingly, even when the intake pipe 65 is provided so as to be displaced upward as described above, the large downward bending of the projecting end portion 72 can suppress rapid expansion of intake air.

The intake air tank 55 includes a first tank half body 74 on the upper side and a second tank half body 76 on the lower side. The first and second tank half bodies 74, 76 are fastened to each other by means of a plurality of tank fastening members 75. The first and second tank half bodies 74, 76 have a bowl shape and are open in the vertical direction (demoting direction D1). By connecting the first and second tank half bodies 74, 76 each having a bowl shape, the air intake chamber 52 for storing intake air is formed. In the present embodiment, the first and second tank half bodies 74, 76 are formed by die-casting molding.

The connecting pipe 64 is integrally molded with a rear wall 74*a* of the first tank half body 74 by die molding. The inlet 66 of the air intake chamber 52 is provided in the first tank half body 74. Meanwhile, a funnel 78 is attached to a bottom wall 76*a* of the second tank half body 76. The funnel 78 serves as an outlet 80 of the air intake chamber 52. In the present embodiment, four funnels 78 whose number is equal to the number of cylinders are provided and disposed along the vehicle widthwise direction. The throttle body 44 is connected to a lower end portion (downstream end portion) of each of the funnels 78. That is, the outlet 80 of the air intake chamber 52 is provided in the second tank half body 76.

Figure 4:
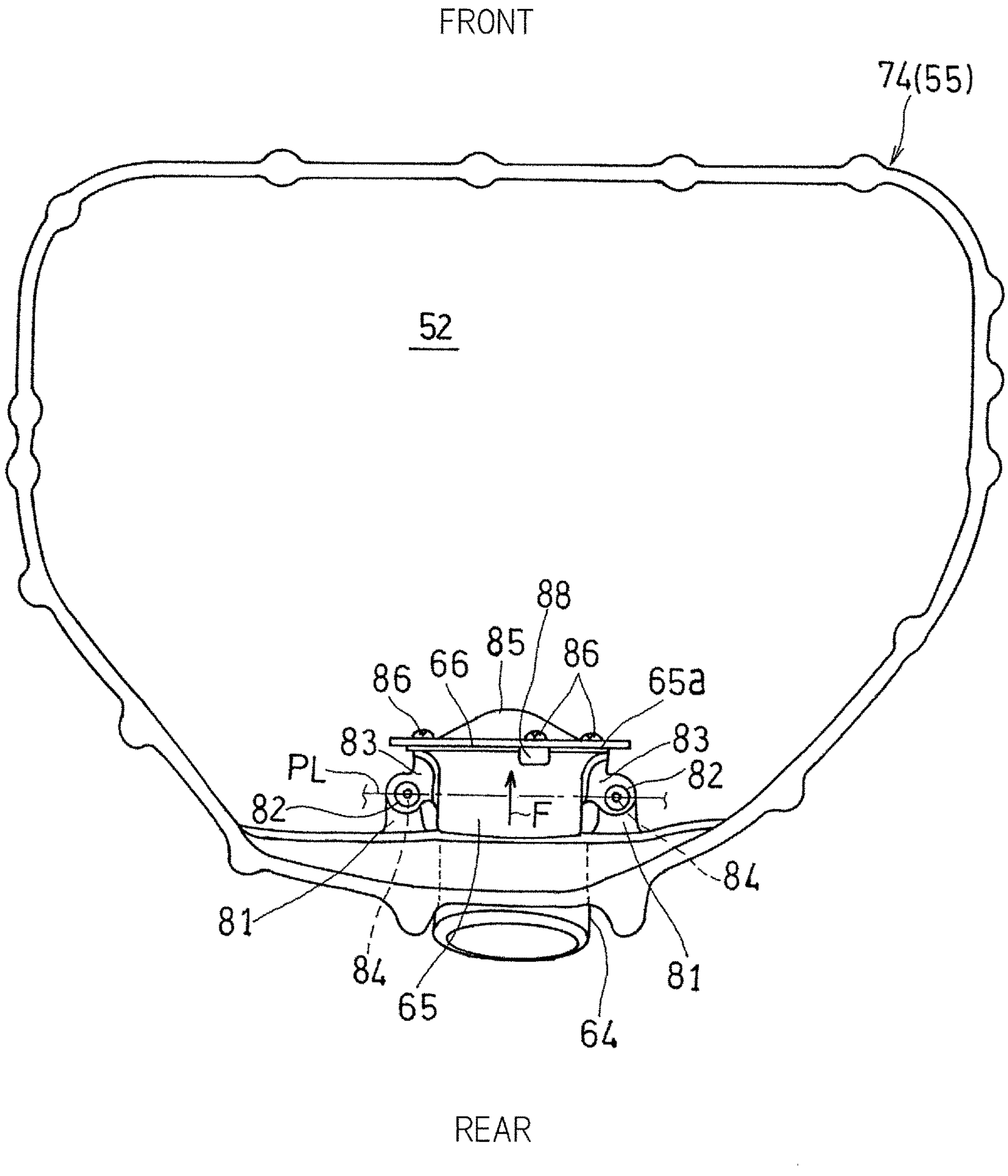
FIG. 4 is bottom view of a first tank half body, from below thereof, of an intake air tank of the air intake chamber structure.

The intake pipe 65 is mounted on the first tank half body 74 shown in FIG. 4 by means of a fastening member 82. The fastening member 82 is fastened from below. In other words, before the half bodies 74, 76 are assembled, the intake pipe 65 is fastened to the first tank half body 74 by means of the fastening member 82 accessible from the second tank half body 76 side. The fastening member 82 is located at the upstream side (rearward) with respect to the protruding end (downstream end) 65*a* of the intake pipe 65. By fastening with the use of the fastening member 82 accessible from below, it is possible to assemble the intake air tank 55 even if the intake pipe 65 is provided as a separate body from the first tank half body 74. As a result, a degree of freedom of design is improved.

In the present embodiment, the fastening member 82 is provided at the left and right lateral sides of the intake pipe 65. Specifically, mounting pieces 83, 83 extending in the left-right direction are formed on the intake pipe 65, and the mounting pieces 83 are fastened to the first tank half body 74 by means of the respective fastening members 82. Since the fastening locations of the intake pipe 65 are present at both lateral sides of the intake pipe 65, it is possible to stably fix the intake pipe 65 to the first tank half body 74. However, the connection of the intake pipe 65 and the first tank half body 74 is not limited to the connection by means of the fastening member 82. For example, a part of the intake pipe 65 may be engaged with the first tank half body 74, or the intake pipe 65 may be press-fitted to the first tank half body 74.

A pair of support pieces 81, 81 are integrally formed with the first tank half body 74. In each of the support pieces 81, a screw hole 84 to which the fastening member 82 is fastened is formed. The screw hole 84 preferably extends in the demoting direction. The support piece 81 extends toward the inside of the intake air tank 55 from the inner surface of the intake air tank 55 along the vertical direction (demoting direction). In the present embodiment, the support piece 81 projects downward from an upper surface of the first tank half body 74. Since the intake pipe 65 is disposed so as to be displaced upward as described above, it is possible to suppress an increase in the dimension in the vertical direction of the support piece 81 extending downward from the upper surface of the first tank half body 74. The mounting pieces 83 preferably project from an upper position with respect to the axis of the intake pipe 65. Accordingly, it is possible to further suppress an increase in size of the support piece 81 in the vertical direction.

In the present embodiment, a fastening direction D1 of the fastening member 82 coincides with the demoting direction D1 shown in FIG. 3. The coincidence between the fastening direction and the demoting direction makes it easier to set the fastening direction of the fastening member in the demoting direction when the mold is set, and thus, the structure allowing stable fastening can be easily realized. The fastening direction D1 of the fastening member 82 is in parallel with a plane PL perpendicular to the intake air flow direction F within the intake pipe 65.

Figure 5:
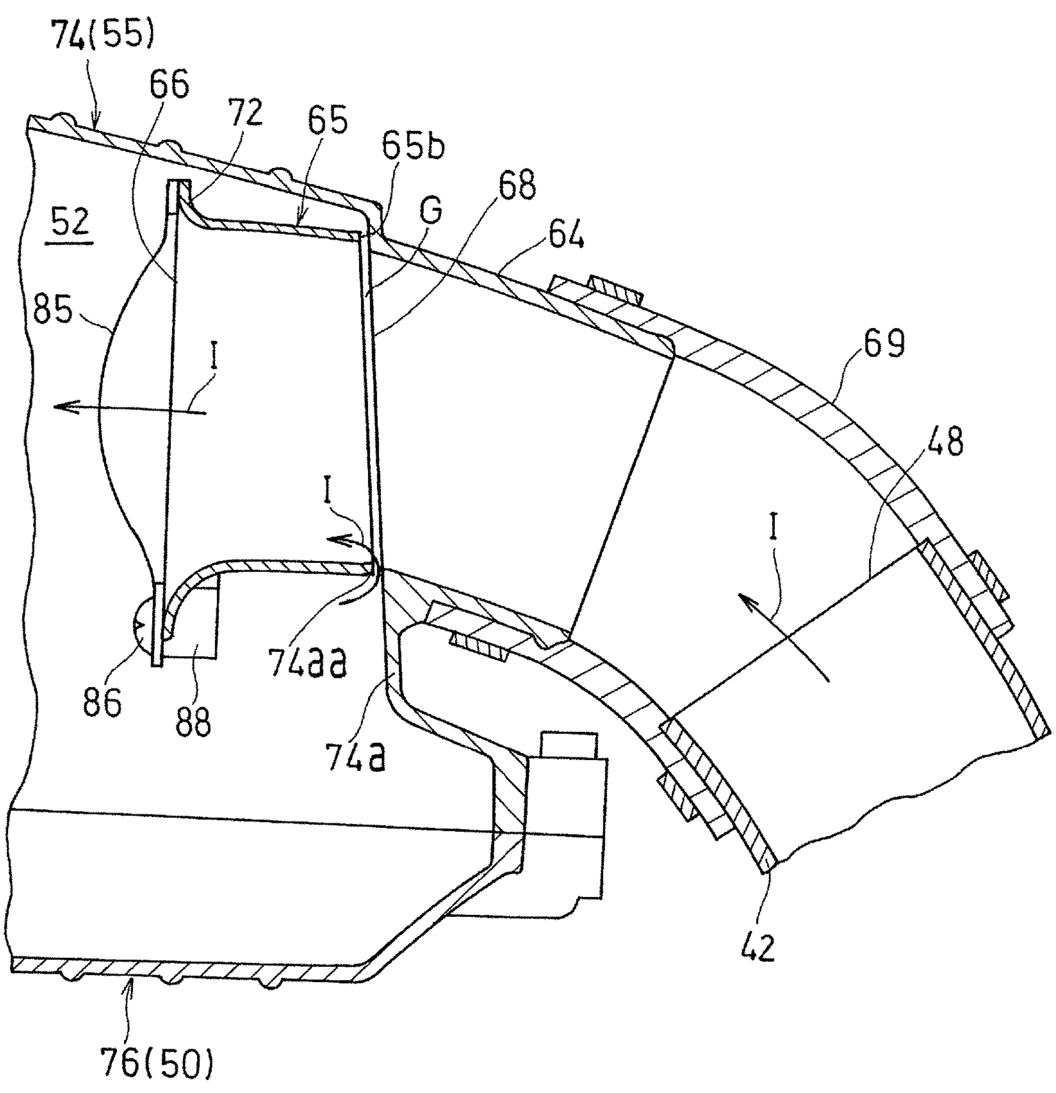
FIG. 5 is an enlarged longitudinal cross-sectional view showing a part of the intake pipe in FIG. 3.

As shown in FIG. 5, the intake pipe 65 and the intake air tank 55 are provided as separate bodies. Therefore, a gap G is formed between an inner wall surface 74*aa* of the rear wall 74*a* of the first tank half body 74 and an upstream side end surface 65*b* that forms the pipe inlet 68 of the intake pipe 65. The gap G allows the absorption of a die casting manufacturing error, a manufacturing error of the intake pipe or the like. Thus, even if the manufacturing error of the tank half bodies 74, 76 and the manufacturing error of the intake pipe 65 occur, the intake pipe 65 can be easily fixed to the first tank half body 74. However, the gap G may be filled with a damper or the like.

A screen member 85 that removes foreign matter is mounted within a passage of the intake pipe 65. In the present embodiment, the screen member 85 is implemented as a wire net. When intake air passes through the screen member 85, foreign matter in the intake air is caught by the wire net and then is removed. The screen member 85 is not limited to the wire net, and may be, for example, a lattice-shaped (mesh) member made of resin. In the present embodiment, the screen member 85 is detachably mounted on the protruding end (the downstream end) 65*a* of the intake pipe 65 by means of a plurality of bolts 86, that is, three bolts 86 in the present embodiment. Specifically, a boss portion 88 is formed at the projecting end portion 72 of the intake pipe 65, and a screw hole (not shown) to which the bolt 86 is fastened is formed in the boss portion 88. However, a rivet may be used instead of the bolt 86.

As shown in FIG. 3, a rib 90 is formed on an outer surface of the first and second tank half bodies 74, 76. The rib 90 is formed to facilitate the flow of molten metal in the first and second tank half bodies 74, 76 at a time of die-casting molding. The rib 90 is made of protrusion extending in a streak shape and projecting outward from the outer surface of the first and second tank half bodies 74, 76. The rib 90 extends in a molten metal flow direction from a center portion of a widthwise direction that is an inlet of the molten metal, and extends in the vehicle widthwise direction in the present embodiment. A plurality of the ribs 90 are formed at an interval in the longitudinal direction of the motorcycle. However, the rib 90 may be formed in a lattice shape. Specifically, it is allowable to form the plurality of ribs that extends in a direction different from the vehicle widthwise direction (for example, the longitudinal direction of the motorcycle) and that crosses the rib 90 extending in the vehicle widthwise direction. By so doing, the flow of molten metal is further facilitated.

When the motorcycle in FIG. 1 runs, coming wind is taken in from the air inlet 24 as the intake air I. The intake air I passes through the air intake duct 50 and is guided rearward of the engine E. Furthermore, the intake air I is introduced to the supercharger 42 through the air cleaner 40 and is pressurized by the supercharger 42. The intake air I pressurized by the supercharger 42 is discharged to the air intake chamber 52. Specifically, the intake air I discharged from the discharge port 48 of the supercharger 42 shown in FIG. 3 passes through the connecting pipe 69, the connecting pipe 64 and the intake pipe 65, and is introduced to the air intake chamber 52. The intake air I stored in the air intake chamber 52 is supplied to the engine E (FIG. 1) through the throttle body 44.

When the intake air I is introduced to the air intake chamber 52, the projecting end portion 72 of the intake pipe 65 has a passage area that increases toward the downstream side, and therefore, the intake air I gradually decelerates within the intake pipe 65. This suppresses rapid expansion of the air intake passage in the air intake chamber 52. Therefore, since the flow of the intake air I is rendered to be smooth, passage loss or pipe friction loss is decreased within the intake pipe 65 and the amount of intake air to be supplied to the engine E is increased. Accordingly, it is possible to improve the output of the engine E without increasing the volume of the air intake chamber 52.

According to the above configuration, the intake pipe 65 does not project outward from the intake air tank 55. Accordingly, even when there is a limitation of space for installing devices as seen in a motorcycle, it is possible to reduce a size of the intake air tank 55 while a decrease in the tank volume is suppressed and the engine output is maintained. Therefore, it is possible to save space around the engine E.

When the intake air I passes through the intake pipe 65, foreign matter within the intake air I is removed by the screen member 85. Therefore, it is possible to prevent foreign matter from intruding into the engine E. When screen members are provided at four funnels 78 that constitute the outlet 80 of the air intake chamber 52, the screen members need to be provided at four locations. However, the above configuration requires merely one screen member. Therefore, it is possible to reduce the number of parts and the number of mounting steps. Since the screen member 85 is detachably mounted on the intake pipe 65, the maintenance is easily performed.

Furthermore, the intake air tank 55 and the intake pipe 65 are formed as separate bodies. Accordingly, it is possible to form the intake pipe 65 without being restricted by the shape of the intake air tank 55 and to improve a degree of freedom of arrangement of the pipe inlet 68 of the intake pipe 65. Specifically, in order to evenly supply intake air to each of the cylinders, the inlet 66 of the air intake chamber 52 needs to be provided at a center portion, in the vehicle widthwise direction, of the intake air tank 55. Therefore, if the intake air tank 55 and the intake pipe 65 are integral with each other, the respective positions of the intake pipe 65 and the supercharger 42 are restricted. When the intake air tank 55 and the intake pipe 65 are provided as separate bodies as shown in the above configuration, even if the pipe inlet 68 of the intake pipe 65 is provided at a position that is displaced toward one lateral side, in the vehicle widthwise direction, e of the intake air tank 55, it is possible to evenly supply intake air to each of the cylinders by the disposition of the pipe outlet 66 (the inlet of the air intake chamber) of the intake pipe 65 at a center portion in the vehicle widthwise direction. Therefore, a degree of freedom of arrangement for each of the supercharger 42 and the pipe inlet 68 of the intake pipe 65 is improved.

Since a degree of freedom of a position, in the vehicle widthwise direction, of the supercharger 42 shown in FIG. 2 is improved, it is easy to dispose the air cleaner 40 and the transmission mechanism 63 that are arranged in the vehicle widthwise direction relative to the supercharger 42. Since a degree of freedom of a position, in the vehicle widthwise direction, of the supercharger 42 is improved, it is easy to increase the size of the air cleaner 40. Accordingly, it is possible to increase the size of a cleaner element and to reduce a passage resistance. As a result, the output of the engine E is improved.

Furthermore, since the intake air tank 55 and the intake pipe 65 are provided as separate bodies, even if the intake pipe 65 is designed to project from the intake air tank 55, it is possible to form the intake air tank 55 by die casting without being restricted in a mold removal direction by the intake pipe 65. Accordingly, it is possible to realize both weight reduction, by realizing a thin-walled tank, of the intake air tank 55 and cost reduction due to improvement in productivity and less machining.

The rib 90 that facilitates fluidity of the molten metal at a time of die-casting molding is formed on the outer surface of each of the first and second tank half bodies 74, 76 shown in FIG. 3. Therefore, the surface area of the intake air tank 55 is increased, and accordingly, heat radiation is improved.

The intake pipe 65 and the discharge port 48 of the supercharger 42 are connected to each other through the connecting pipe 64 integrally formed with the intake air tank 55. The connecting pipe 64 in the present embodiment tilts downward in the rear direction toward the discharge port 48 of the supercharger 42. Since the connecting pipe 64 can be molded by use of a slider core, it is possible to adjust the orientation thereof Therefore, a degree of freedom of arrangement of the supercharger 42 to be connected to the connecting pipe 64 is improved.

The intake pipe 65 is fastened to the first tank half body 74 by means of the fastening member 82 (FIG. 4) accessible from the second tank half body 76 side. By setting the fastening direction D1 of the fastening member 82 in consideration of the demoting direction D1 of die-casting molding, the assembly performance of the intake air tank 55 and the intake pipe 65 is improved.

As shown in FIG. 4, since the fastening member 82 is located at the upstream side with respect to the protruding end 65*a* of the intake pipe 65, the intake air I discharged from the intake pipe 65 does not interfere with the fastening member 82. The fastening direction D1 of the fastening member 82 shown in FIG. 3 is in parallel with the plane PL perpendicular to the intake air flow direction F within the intake pipe 65. Therefore, when the fastening member 82 shown in FIG. 4 is mounted, it is possible to mount the intake pipe 65 on the intake air tank 55 without restricting the shape of the intake pipe 65 having a passage area that increases toward the downstream. Accordingly, it is possible to prevent a decrease in suction efficiency due to the fastening member 82.

The intake pipe 65 merely needs to have a passage area that is set to be larger at the pipe outlet 66 than at the pipe inlet 68 and have a passage area that increases toward the downstream side in the intake air flow direction F so as to have a flare shape, and therefore is not limited to the shape in the present embodiment.

The present invention is not limited to the above embodiment, and various additions, changes, or deletions can be made without departing from the gist of the present invention. For example, the supercharger 42 is not limited to a mechanical type, and may be a turbocharger. The supercharger 42 is not limited to a supercharger having a centrifugal impeller. The air intake chamber structure according to the present invention is preferably applicable to a motorcycle having an installation space that is largely limited. It should be noted that the air intake chamber structure according to the present invention is applicable to a vehicle other than the motorcycle, and is also applicable to a non-vehicle engine. Therefore, these are construed as included within the scope of the present invention.

REFERENCE NUMERALS

26 . . . crankshaft
28 . . . crankcase
30 . . . cylinder
32 . . . cylinder head
42 . . . supercharger
48 . . . discharge port (outlet) of supercharger
52 . . . air intake chamber
55 . . . intake air tank
64 . . . connecting pipe
65 . . . intake pipe
66 . . . inlet of air intake chamber (pipe outlet of intake pipe)
68 . . . pipe inlet of intake pipe
72 . . . projecting end portion
74 . . . first tank half body
76 . . . second tank half body
82 . . . fastening member
85 . . . screen member
90 . . . rib
D1 . . . fastening direction
E . . . engine
SP . . . air intake passage

What is claimed is:

1. An air intake chamber structure comprising:

an air intake passage having a supercharger that pressurizes intake air to supply the pressurized intake air to an engine;

an intake air tank forming an air intake chamber therein, the air intake chamber storing the pressurized intake air; and an intake pipe mounted on the intake air tank and formed as a separate body from the intake air tank, wherein the intake pipe serves as an inlet of the air intake chamber and projects inward of the air intake chamber, and at least a projecting end portion in the intake pipe has a passage area that increases toward a downstream side with respect to an intake air flow direction.

2. The air intake chamber structure as claimed in claim 1, wherein a passage area in the intake pipe is set to be larger at an outlet thereof than at an inlet thereof, and gradually increases from the inlet toward the outlet so as to have a flare shape.

3. The air intake chamber structure as claimed in claim 1, wherein the intake air tank includes first and second tank half bodies, the first and second tank half bodies are formed by die-casting molding, and the intake pipe is fastened to one of the first and second tank half bodies by means of a fastening member accessible from a side of the other of the first and second tank half bodies.

4. The air intake chamber structure as claimed in claim 1, wherein the intake pipe is fastened to the intake air tank by means of a fastening member, and the fastening member is located at an upstream side relative to a protruding end of the intake pipe with respect to the intake air flow direction.

5. The air intake chamber structure as claimed in claim 1, wherein the intake pipe is fastened to the intake air tank by means of a fastening member, and a fastening direction of the fastening member is in parallel with a plane perpendicular to the intake air flow direction within the intake pipe.

6. The air intake chamber structure as in claimed in claim 1, wherein the intake air tank includes first and second tank half bodies, and the intake pipe is fastened to one of the first and second tank half bodies by means of a fastening member, the first and second tank half bodies are formed by die-casting molding, and a rib is formed on an outer surface of the one tank half body on which the intake pipe is mounted, the rib facilitating fluidity of molten metal within the one tank half body at a time of die-casting molding.

7. The air intake chamber structure as claimed in claim 1, further comprising a screen member configured to remove foreign matter and mounted within a passage of the intake pipe.

8. A saddle-riding vehicle including the air intake chamber structure as claimed in claim 1, wherein the engine includes a crankcase supporting a crankshaft, a cylinder projecting upward from a front portion of the crankcase, and a cylinder head disposed above the cylinder and forming an upper surface of a combustion chamber therein, the supercharger is disposed above the crankcase in a side view, the intake air tank forming the air intake chamber therein is disposed above the supercharger, and an outlet of the supercharger is directed upward toward the intake air tank, and the outlet of the supercharger and the intake pipe are connected to each other through a connecting pipe.

* * * * *